(No Model.) 2 Sheets—Sheet 1.
J. H. TIFFANY.
CART.
No. 308,933. Patented Dec. 9, 1884.
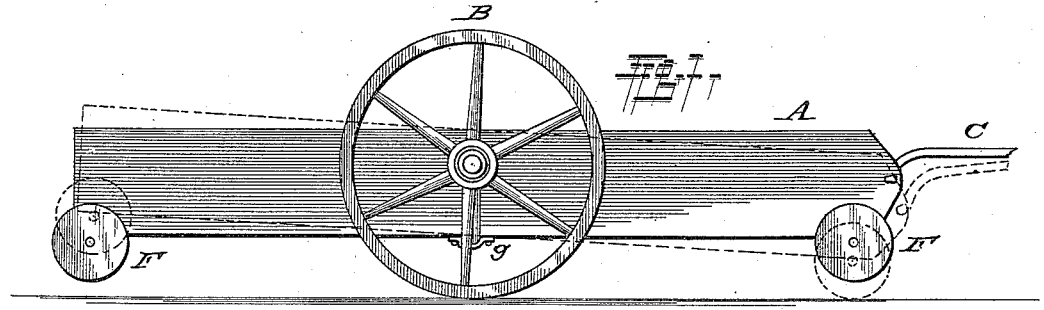
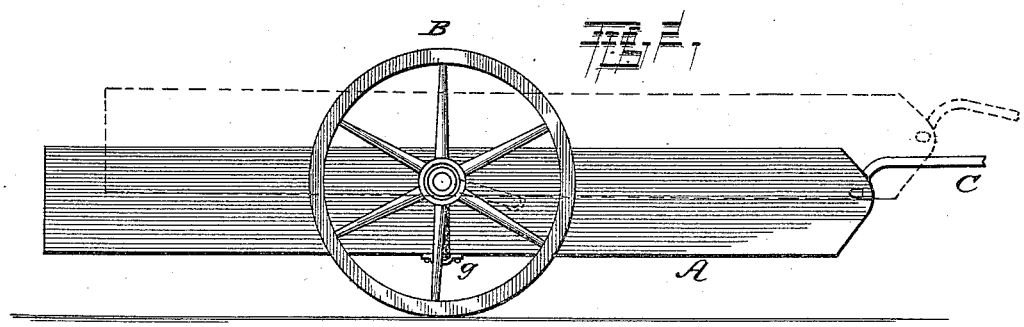
WITNESSES:
Fred. G. Dieterich.
J H Blackwood
INVENTOR,
John H. Tiffany
by W. H. Doolittle
ATTORNEY.

(No Model.)  2 Sheets—Sheet 2.
J. H. TIFFANY.
CART.
No. 308,933. Patented Dec. 9, 1884.
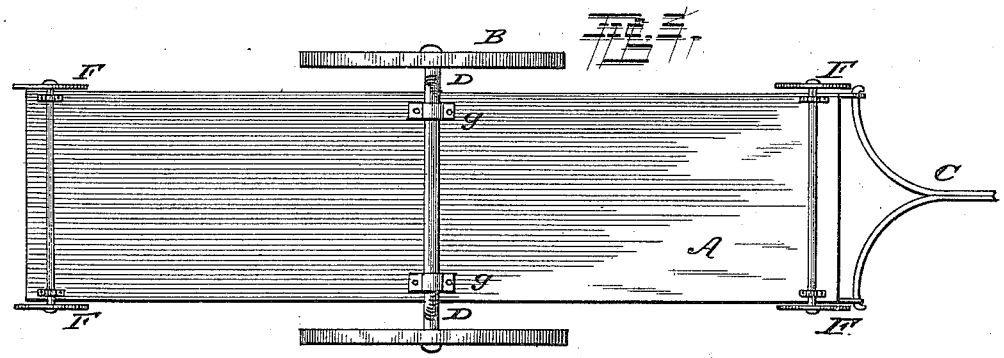
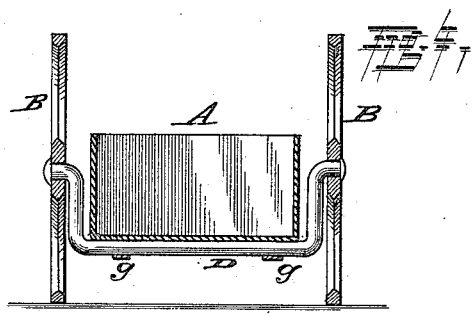
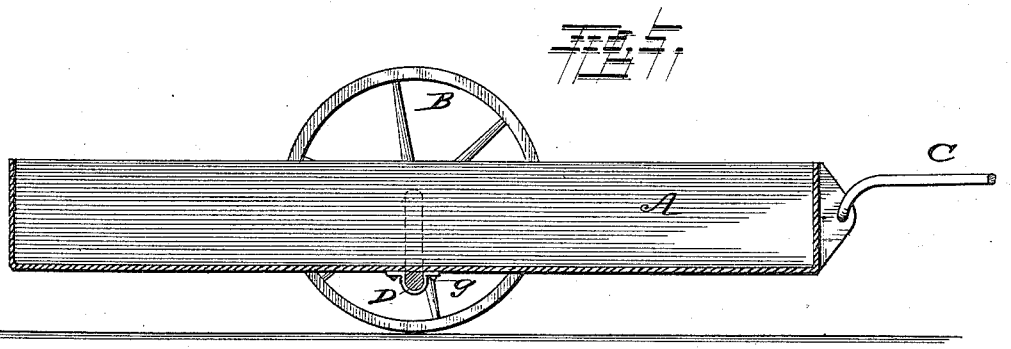
WITNESSES:
Fred G. Dieterich.
J. H. Blackwood
INVENTOR,
John H. Tiffany
by W. H. Doolittle
ATTORNEY

UNITED STATES PATENT OFFICE.

JOHN H. TIFFANY, OF DIMOCK, PENNSYLVANIA.

CART.

SPECIFICATION forming part of Letters Patent No. 308,933, dated December 9, 1884.

Application filed April 12, 1884. (No model.)

*To all whom it may concern:*

Be it known that I, JOHN H. TIFFANY, a citizen of the United States, residing at Dimock, in the county of Susquehanna and State of Pennsylvania, have invented certain new and useful Improvements in Carts; and I do hereby declare the following to be a full, clear, and exact description of the invention, such as will enable others skilled in the art to which it appertains to make and use the same.

My invention relates to vehicles, but more particularly to draft-carts; and it consists of an improvement which is partly shown and described in my pending application numbered 119,102. In that application runners applied to the under side of a two-wheeled cart, with or without smaller wheels to co-operate with large central wheels in sustaining a load, form the subject of the claims.

The improvement in this application consists, chiefly, in providing a two-wheeled cart with a jointed or flexible tongue, whereby, when desired, smaller wheels may be applied to the cart and operated to aid the central wheels in sustaining the load.

It also consists in an improvement in the manner of attaching the axle supporting the central wheels to the body of the cart, by which the operation of the vehicle as a whole is facilitated when an obstruction is met.

The improvements are illustrated in the accompanying drawings, in which Figure 1 is a side view showing relative positions of large and small wheels and jointed tongue; Fig. 2, a similar view without the small wheels, showing action of the axle; Fig. 3, a bottom plan view; Fig. 4, an end view; and Fig. 5, a side view of a vehicle, showing position of body of vehicle when supported by central wheels in connection with the jointed tongue.

In the drawings, A represents the body of a cart, and B the central wheels. These large central wheels are carried by a bent axle, D. The object of employing a bent axle is to enable the body of the cart to be set low. Such form of axle, of course, which may be made in two parts, is well known; but the manner in which I attach it to the body has its advantages, which will be hereinafter explained. A straight axle may be used, when preferred.

F F are small wheels, which may be connected with swivels and casters, to move easily and admit the turning of the vehicle, and one of which may be attached to each end or corner of the vehicle or cart, and when the central wheels rest upon the ground the smaller wheels are out of plane therewith. The use of the smaller wheels is convenient when heavy and unbalanced loads are hauled over uneven ground. By the tipping forward or back of the load at such a time the smaller wheels aid the larger ones in sustaining the load.

C is a tongue, which is shown in the drawings, Fig. 3, as forked, and the two arms of which are connected with the body by extending through the side pieces of the vehicle, so as to turn freely in their supports; but I do not confine myself to this form of a jointed tongue. Any joint that may render the tongue flexible at the point of its connection with the body will be comprised by my invention. A spring-connection, for instance, might be employed for making the tongue flexible at this point.

Thills may be used in place of the tongue.

In using the cart upon level ground, or where no great obstruction is met, the flexible tongue will be found efficient when the smaller wheels are dispensed with, as shown in Fig. 2.

The important advantages of a flexible tongue in this combination are as follows: It relieves the team from the weight of the load at all times. It permits the body of the vehicle to tip forward and backward onto the end wheels, so they can aid the central wheels in sustaining the load. It causes the cart to adapt itself to uneven ground and rough places, and all the parts to help sustain the load, and it admits placing the body of the vehicle much nearer the ground than any other vehicle that is sustained by wheels. In going down grade the team, in holding back by this tongue, bears the fore end of the vehicle on the ground, which acts as an excellent brake, and there may be blocks or something used to protect the cart at such times, and it causes the draft of the team to balance the load.

By the use of the term "flexible tongue" I mean a stiff tongue provided with a joint near the point of its junction with the body, and do not mean to include a rope or chain, as in such case the cart could not be guided and turned or backed, as it may be by the tongue I employ. The bent axle D is attached to the bottom of the vehicle by means of clips or loops *g*, as shown at Fig. 3. These loops are of such size as to permit the axle to roll freely therein; or, if desired, the bent axle may be in two parts, so that one end can roll under the body of the cart and swing when one of the large wheels meets an obstruction, without interfering with the other end or wheels. To such an extent does the axle thus swing when the larger wheels meet an obstruction that the body continues to move forward without being shocked, and the obstruction thereby is more easily overcome. The action of the axle in this particular is shown in Fig. 2.

I am aware that it is old to use flexible tongues in connection with some forms of wagons and with sleds, and with vehicles provided with sled-runners; and I am also aware that trucks having large central wheels and smaller end wheels are old; but I am not aware that a flexible tongue has been used with vehicles having central wheels when the load is sustained by such wheels while the cart is moving.

What I claim, and desire to secure by Letters Patent, is—

1. In a vehicle of the character described, the combination, with the body of the vehicle, of the large central wheels, the bent swinging axle secured to the bottom of said body by supports, so that the said axle or one part will roll therein and swing under the body, the jointed tongue, and the smaller wheels, as and for the purposes described.

2. The combination, in a vehicle, of the flexible tongue with the body, the large central wheels, and the smaller wheels, substantially as described.

In testimony whereof I affix my signature in presence of two witnesses.

JOHN H. TIFFANY.

Witnesses:
J. H. BLACKWOOD,
R. G. DuBOIS.